United States Patent
Liao

(10) Patent No.: US 9,451,412 B1
(45) Date of Patent: Sep. 20, 2016

(54) MOBILE DEVICE AND METHOD FOR EXECUTING A FUNCTION THEREOF

(71) Applicant: HTC Corporation, Taoyuan (TW)

(72) Inventor: Chi-Yi Liao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/639,130

(22) Filed: Mar. 5, 2015

(51) Int. Cl.
*H04W 24/00* (2009.01)
*H04W 4/04* (2009.01)
*H04L 29/08* (2006.01)

(52) U.S. Cl.
CPC .............. *H04W 4/04* (2013.01); *H04L 67/22* (2013.01)

(58) Field of Classification Search
CPC ... H04W 64/00; H04W 48/18; H04W 4/028; H04W 24/00; H04W 4/023; H04W 84/12; G01S 19/34; G01S 5/0252; G01S 5/0054; G01S 5/021
USPC ...... 455/456.1, 434, 574, 418, 456.3, 456.6; 370/329, 392, 342; 342/357.28, 451
See application file for complete search history.

(56) References Cited

U.S. PATENT DOCUMENTS

| | | | |
|---|---|---|---|
| 8,195,108 B2 | 6/2012 | Sheynblat et al. | |
| 2011/0255524 A1 | 10/2011 | Huang | |
| 2015/0247917 A1* | 9/2015 | Gum | G01C 5/06 342/452 |
| 2015/0350068 A1* | 12/2015 | Tung | H04W 80/06 370/392 |

* cited by examiner

*Primary Examiner* — Dhaval Patel
(74) *Attorney, Agent, or Firm* — Jianq Chyun IP Office

(57) ABSTRACT

A mobile device is provided. The mobile device includes a transceiver, a sensor unit, a storage device and a processor. The sensor unit detects the position and the motion of the mobile device to provide sensor data. The storage device stores activity records. The processor obtains an identification code of the base station connected to the mobile device through the transceiver and calculates the height of the mobile device according to the sensor data. When the identification code of the base station and the height of the mobile device match those in an activity record, the processor executes a predetermined function corresponding to the activity record. When the execution of the predetermined function fails, the processor generates a moving trail of the mobile device according to the sensor data. When the moving trail of the mobile device matches that in the activity record, the processor executes the predetermined function.

14 Claims, 3 Drawing Sheets

MOBILE DEVICE AND METHOD FOR EXECUTING A FUNCTION THEREOF

BACKGROUND OF THE INVENTION

1. Field of the Invention

The invention relates to a mobile device and a controlling method thereof, and more particularly to a mobile device and a method for executing a function thereof.

2. Description of Related Art

With improvement of computing capability of mobile devices, the bandwidth of wireless network is also increased continuously. Currently, it is common that people transmit data by using mobile devices via wireless transmission protocols such as Wi-Fi, Bluetooth or 3G/4G.

Currently, each wireless transmission interface of mobile devices may be switched on or off manually by the user. For example, the user may switch on the 3G/4G wireless transmission interface manually and play games via the 3G/4G wireless transmission interface. For instance, the user may switch on the Bluetooth wireless transmission interface manually for connection with the stereo system in a car via the Bluetooth wireless transmission interface to play the music files stored in the mobile device. When one of the above wireless transmission interfaces is no longer needed, the user may switch off the interface manually to save power.

It is troublesome for the user to switch on or off the above functions manually. The user may choose to keep the wireless transmission interface in an on status permanently to save the trouble of manual operations, however, which causes additional power consumption. For example, in that case, a corresponding wireless transceiver will be kept on and continue to consume power.

SUMMARY OF THE INVENTION

The invention provides a mobile device and a method for executing a function thereof, which may save the user's trouble to perform manual operations while avoiding the problem of continuing power consumption.

In the invention, the mobile device includes a transceiver, a sensor unit, a storage device and a processor. The sensor unit detects a position and an action of the mobile device for providing sensor data. The storage device stores activity records. The processor is coupled to the transceiver, the sensor unit and the storage device. The processor obtains a first identification code of a base station connected to the mobile device via the transceiver and calculates first height where the mobile device is positioned based on the sensor data. When the first identification code of the base station and the first height of the mobile device are consistent with a second identification code and second height in one of the activity records, the processor executes a predetermined function corresponding to the activity record. When the predetermined function is not executed successfully, the processor generates a first moving trail of the mobile device based on the sensor data. When the first moving trail of the mobile device is consistent with a second moving trail in the activity record, the processor executes the predetermined function.

In the invention, the method for executing a function may be applied to the mobile device described above. The method for executing a function includes the following steps, obtaining a first identification code of a base station connected to the mobile device; detecting the position and action of the mobile device for providing sensor data; calculating first height where the mobile device is positioned based on the sensor data; when the first identification code of the base station and the first height of the mobile device are consistent with a second identification code and second height in one of the activity records, executing a predetermined function corresponding to the activity record; when the predetermined function is not executed successfully, generating a first moving trail of the mobile device based on the sensor data; when the first moving trail of the mobile device is consistent with a second moving trail in the activity record, executing the predetermined function.

Based on the above, the invention may allow the predetermined function to be switched on or off automatically according to the position of the mobile device and the activity records of the user, whereby saving the user's trouble in performing manual operations and reducing power consumption of the mobile device.

In order to make the aforementioned features and advantages of the invention more comprehensible, embodiments accompanying figures are described in detail below.

DESCRIPTION OF EMBODIMENTS

Figure 1:
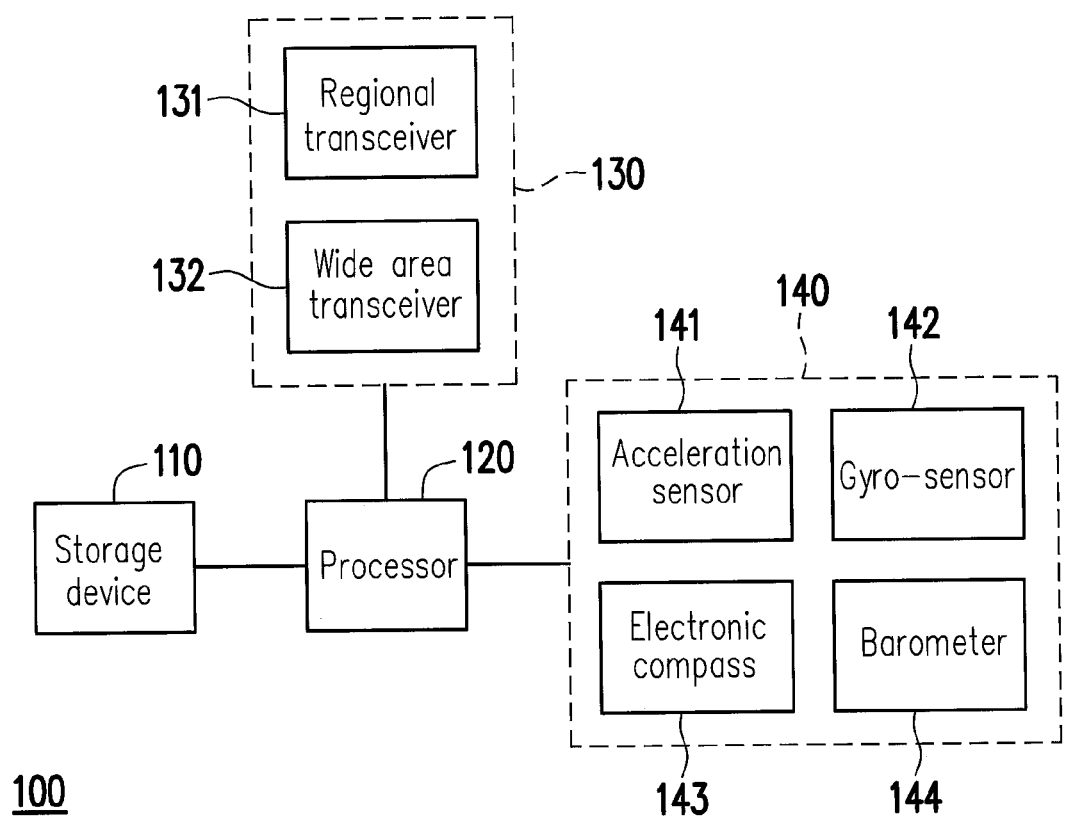
FIG. 1 is a schematic view illustrating a mobile device according to an embodiment of the invention.

FIG. 1 is a schematic view illustrating a mobile device 100 according to an embodiment of the invention. The mobile device 100 may be a portable electronic device such as a smart phone, a personal digital assistant (PDA) or a tablet PC. The mobile device 100 includes a storage device 110, a processor 120, a transceiving unit 130 and a sensor unit 140. The processor 120 is coupled to the storage device 110, the transceiving unit 130 and the sensor unit 140. The storage device 110 may store the activity records of the user as basis for automatically triggering certain predetermined functions. The transceiving unit 130 includes a regional transceiver 131 and a wide area transceiver 132. The regional transceiver 131 may transmit or receive information for the mobile device 100 via regional wireless transmission protocols such as Wi-Fi or Bluetooth. The wide area transceiver 132 may transmit or receive information for the mobile device 100 via wide area wireless transmission protocols such as 3G or 4G. The sensor unit 140 includes an acceleration sensor 141, a gyro-sensor 142, an electronic compass 143 and a barometer 144. The sensor unit 140 may detect the position and action of the mobile device 100 for providing sensor data.

Figure 2:
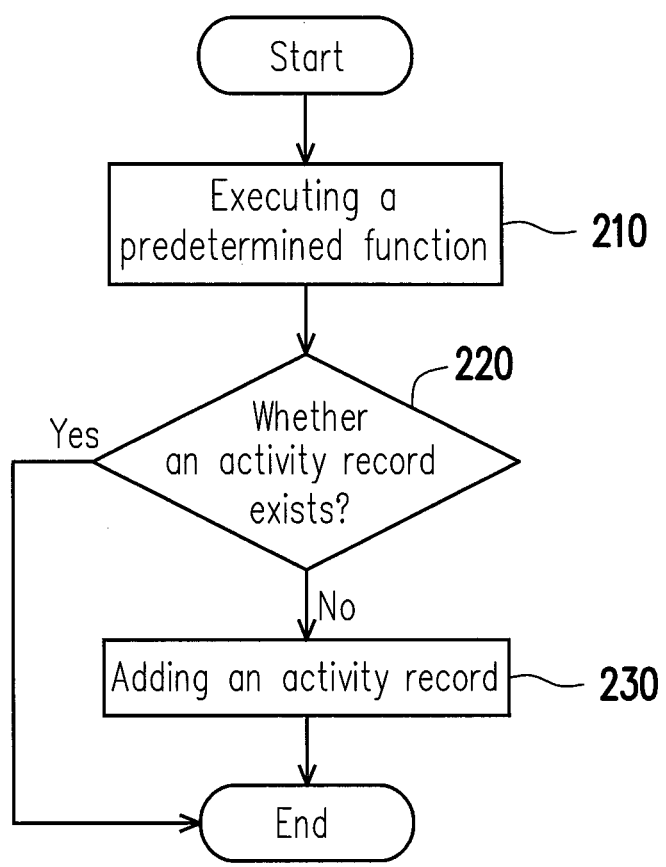
FIG. 2 is a flowchart illustrating a method for executing a function according to an embodiment of the invention.

FIG. 2 is a flowchart illustrating a method for executing a function according to an embodiment of the invention. The method may be executed by the mobile device 100. In step 210, the processor 120 executes a predetermined function. The predetermined function is usually executed corresponding to the user's operations. For example, when the user activates a web page browser or an online game, the predetermined function in step 210 may be activating the regional transceiver 131 and transmitting and/or receiving data from the web page browser or data of the online game via the regional transceiver 131 and a regional wireless hotspot such as a Wi-Fi hotspot.

In step 220, the processor 120 checks whether the storage device 110 has stored an activity record corresponding to the predetermined function. If the activity record corresponding to the predetermined function does not exist in the storage device 110, in step 230, the processor 120 adds an activity record corresponding to the predetermined function in the storage device 110.

The processor 120 may be connected to a cellular radio access network such as 3G or 4G network via the wide area transceiver 132. The processor 120 may obtain an identification code of a base station used by the mobile device 100 via the wide area transceiver 132. The identification code may be used for positioning the mobile device 100. The processor 120 may also calculate the height where the mobile device 100 is positioned based on the sensor data provided by the barometer 144. The height may represent a floor where the mobile device 100 is located. The combination of the identification code of the base station and the height of the mobile device 100 may represent the position where the mobile device 100 is located. In step 230, the processor 120 may incorporate the identification code of the base station and the height of the mobile device 100 into the activity record.

The relation between the sensor data of the barometer 144 and the height of the mobile device 100 may vary depending on weather conditions. To calculate the height more accurately, the processor 120 may obtain the latest weather report via the wide area transceiver 132 and calibrate the height of the mobile device 100 at least according to one of the temperature, humidity and atmosphere included in the weather report.

As mentioned above, the predetermined function in the step 210 may be transmitting and/or receiving data via the regional transceiver 131 and a regional wireless hotspot. In step 230, the processor 120 may incorporate the identification code and password of the regional wireless hotspot into the activity record, such that when the processor 120 executes the predetermined function again in the method flowchart shown by FIG. 3, the processor 120 may automatically use the identification code and password of the regional wireless hotspot in the activity record for connection with the regional wireless hotspot.

If the password of the regional wireless hotspot is a public known password or preset in the mobile device 100, the processor 120 does not need to add the password to the activity record but only add the identification code of the regional wireless hotspot to the activity record. Accordingly, when the processor 120 in the method flowchart as shown by FIG. 3 executes the predetermined function again, the processor 120 may automatically use the identification code of the regional wireless hotspot in the activity record for connection with the regional wireless hotspot.

The above-mentioned regional wireless hotspot may be a regional wireless hotspot that meets wireless transmission protocol such as Wi-Fi, Bluetooth, 3G or 4G.

In another embodiment, the predetermined function described in step 210 may be other functions such as starting playing music, stopping playing music, executing or closing one of application software in the mobile device 100, or activating or closing a portion of the hardware of the mobile device 100.

Figure 3:
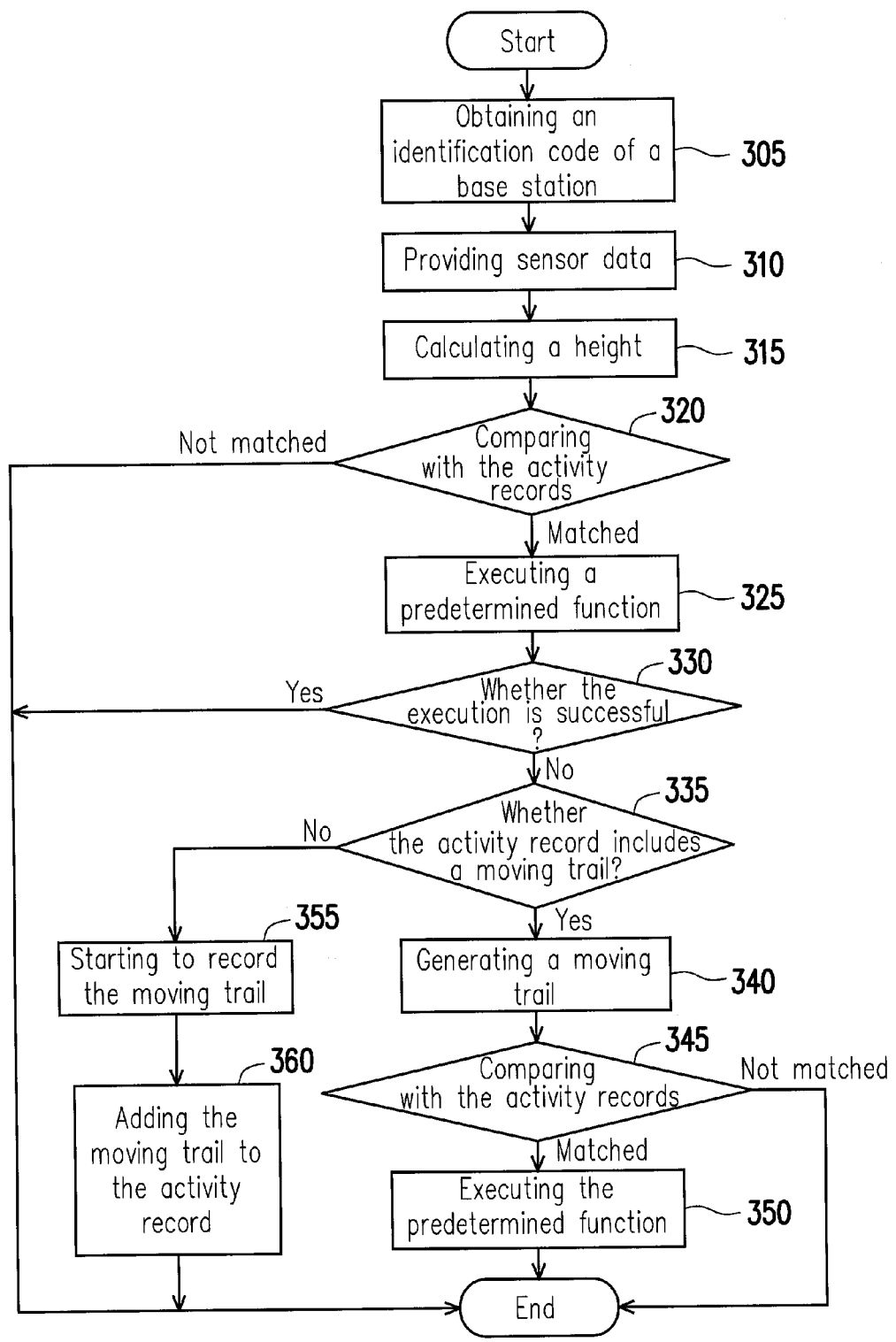
FIG. 3 is a flowchart illustrating a method for executing a function according to another embodiment of the invention.

FIG. 3 is a flowchart illustrating a method for executing a function according to another embodiment of the invention. The method may be executed by the mobile device 100. In step 305, the processor 120 obtains an identification code of a base station used by the mobile device 100 via the wide area transceiver 132. In step 310, the sensor unit 140 detects the position and action of the mobile device 100 for providing sensor data. In step 315, the processor 120 calculates a height of the mobile device 100 based on the sensor data. As described above, the processor 120 may obtain the weather report via the wide area transceiver 132 and calibrate the height of the mobile device 100 according to the weather report.

In step 320, the processor 120 compares the identification code of the base station and the height of the mobile device 100 with the activity records in the storage device 110. If there is no activity record that is consistent with the identification code of the base station and the height of the mobile device 100, the process ends at this stage. If the identification code of the base station and the height of the mobile device are consistent with the identification code and height in one of the activity records stored in the storage device 110, the processor 120 executes a predetermined function corresponding to the activity record in step 325.

As mentioned above, the predetermined function may be activating the regional transceiver 131 and transmitting and/or receiving data via the regional transceiver 131 and a regional wireless hotspot. Prior to the step 325, if the mobile device 100 is using the wide area transceiver 132 to transmit and/or receive data, the processor 120 may switch transmission and/or reception of the data to the regional transceiver 131 in step 325.

When the user of the mobile device 100 is away from the regional wireless hotspot, the mobile device 100 may lose the signal of the regional wireless hotspot. When the regional wireless hotspot loses the signal for a time length that is shorter than a predetermined value (e.g. 10 seconds or other time length), the processor 120 may still retain the predetermined function. When the regional wireless hotspot loses the signal for a time length that is longer than the predetermined value, the processor 120 may deactivate the predetermined function, that is, close the regional transceiver 131. Prior to the step 325, if the mobile device 100 is using the wide area transceiver 132 to transmit and/or receive data, the processor 120 may switch the transmission and/or reception of the data back to the wide area transceiver 132 for execution after the regional transceiver 131 is closed.

In step 330, the processor 120 checks whether the predetermined function is executed successfully. For example, when the predetermined function is to transmit and/or receive data via the regional wireless hotspot, it is likely that the function cannot be executed successfully under the circumstances where the regional wireless hotspot in the activity record is not found. At this time, the processor 120 may close the regional transceiver 131.

If the predetermined function is executed successfully, the process ends at this stage. If the predetermined function is not executed successfully, the processor 120 may check, in step 335, whether the activity record that is determined to be consistent in the step 320 includes a moving trail of the mobile device 100. If not, the process goes to step 355; if yes, the process goes to step 340.

In step 355, the processor 120 begins to record the moving trail of the mobile device 100 until the same predetermined function is executed successfully next time. Next, the processor 120 adds the moving trail to the activity record in step 360. For example, the user may once connect to a regional wireless hotspot successfully at a position, but fail to connect to the regional wireless hotspot at the same position some other time and once again connect to the regional wireless hotspot successfully after moving within a short distance. If the above situation happens, the moving trail in the activity record may serve as basis for automatically executing the predetermined function in subsequent operations.

The moving trail is from the sensor data provided by the sensor unit 140. The acceleration sensor 141 may be used as a pedometer. The gyro-sensor 142 may detect the angular velocity of rotation of the mobile device 100. The electronic compass 143 may sense the direction of the mobile device 100. The barometer 144 may sense the height of the mobile device 100. All of the above four sensing devices 141-144 may detect the moving trail of the mobile device 100. Therefore, the moving trail may include the sensor data that is output by at least one of the four sensing devices 141-144.

In another embodiment, the moving trail may include data that is generated by further processing the sensor data output by at least one of the sensing devices 141-144. For example, the moving trail may include a sum of three accelerations corresponding to three coordinate axes output by the acceleration sensor 141, or include a sum of three angular velocity corresponding to three coordinate axes output by the gyro-sensor 142, or include a height of the mobile device 100 generated by calculating according to output of the barometer 144.

In step 340, the processor 120 may still use the same approach to generate the moving trail of the mobile device 100. In step 345, the processor 120 may compare the moving trail generated in the step 340 with the moving trail in the activity record. If the two moving trails are not consistent with each other, the process ends at the stage. If the two moving trails are consistent with each other, the processor 120 executes the predetermined function corresponding to the activity record in step 350.

Generally, people nowadays live a life with repeated activities. The invention may record the position of the mobile device when executing the predetermined function, and execute the same predetermined function automatically at the same position next time. For example, when the user enters an office, the mobile device may automatically activate the regional transceiver for connection with the regional wireless hotspot. When the user returns to his/her residence, the mobile device may automatically play music. In brief, the invention may automatically execute the predetermined function to save the user's trouble of performing manual operations. The invention may automatically switch to a wireless transmission protocol with faster speed. The invention may also automatically activate or deactivate a portion of the hardware of the mobile device to prevent the portion of hardware from continuously consuming power.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A mobile device, comprising:
   a transceiver;
   a sensor unit, detecting a position and an action of the mobile device for providing sensor data;
   a storage device, stored an activity record; and
   a processor coupled to the transceiver, the sensor unit and the storage device, obtaining a first identification code of a base station connected to the mobile device via the transceiver, calculating first height where the mobile device is positioned based on the sensor data, wherein, when the first identification code of the base station and the first height of the mobile device are consistent with a second identification code and second height in the activity record, the processor executes a predetermined function corresponding to the activity record; when the predetermined function is not executed successfully, the processor generates a first moving trail of the mobile device based on the sensor data; when the first moving trail of the mobile device is consistent with a second moving trail in the activity record, the processor executes the predetermined function, wherein the predetermined function is transmitting and/or receiving data via a regional wireless hotspot; when the regional wireless hotspot loses a signal for a time length shorter than a predetermined value, the processor retains the predetermined function; when the time length is longer than the predetermined value, the processor deactivates the predetermined function.

2. The mobile device according to claim 1, wherein the processor obtains a weather report via the transceiver and calibrates the first height of the mobile device according to the weather report.

3. The mobile device according to claim 2, wherein the processor calibrates the first height of the mobile device at least according to one of temperature, humidity and atmosphere included in the weather report.

4. The mobile device according to claim 1, wherein, when the processor executes the predetermined function and the storage device does not store the activity record, the processor adds the activity record to the storage device and adds the first identification code of the base station and the first height of the mobile device to the activity record.

5. The mobile device according to claim 4, wherein the processor also adds a third identification code of the regional wireless hotspot to the activity record when adding the activity record, the processor automatically uses the third identification code of the regional wireless hotspot in the activity record for connection with the regional wireless hotspot when executing the predetermined function next time.

6. The mobile device according to claim 5, wherein the processor also adds a first password of the regional wireless hotspot to the activity record when adding the activity record, the processor automatically uses the third identification code and the first password of the regional wireless hotspot in the activity record for connection with the regional wireless hotspot when executing the predetermined function next time.

7. The mobile device according to claim 4, wherein, when the predetermined function is not executed successfully and the activity record does not include the first moving trail, the processor begins to record the first moving trail of the mobile device until the predetermined function is successfully executed next time, and adds the first moving trail of the mobile device to the activity record.

8. A method for executing a function for a mobile device, comprising:
   obtaining a first identification code of a base station connected to the mobile device;
   detecting a position and an action of the mobile device for providing sensor data;
   calculating first height where the mobile device is positioned based on the sensor data;
   when the first identification code of the base station and the first height of the mobile device are consistent with a second identification code and second height in an activity record, executing a predetermined function corresponding to the activity record;

when the predetermined function is not executed successfully, generating a first moving trail of the mobile device based on the sensor data;

when the first moving trail of the mobile device is consistent with a second moving trail in the activity record, executing the predetermined function, wherein the predetermined function is transmitting and/or receiving data via a regional wireless hotspot;

retaining the predetermined function when the regional wireless hotspot loses a signal for a time length shorter than a predetermined value; and deactivating the predetermined function when the time length is longer than the predetermined value.

9. The method for executing the function according to claim 8, further comprising:

obtaining a weather report; and calibrating the first height of the mobile device according to the weather report.

10. The method for executing the function according to claim 9, further comprising:

calibrating the first height of the mobile device at least according to temperature, humidity and atmosphere included in the weather report.

11. The method for executing the function according to claim 8, further comprising:

adding the activity record when executing the predetermined function and the activity record is not stored, and adding the first identification code of the base station and the first height of the mobile device to the activity record.

12. The method for executing the function according to claim 11, wherein the method for executing the function further comprises:

adding a third identification code of the regional wireless hotspot to the activity record when adding the activity record; and automatically using the third identification code of the regional wireless hotspot in the activity record for connection with the regional wireless hotspot when executing the predetermined function next time.

13. The method for executing the function according to claim 12, further comprising:

adding a first password of the regional wireless hotspot to the activity record when adding the activity record; and automatically using the third identification code and the first password of the regional wireless hotspot in the activity record for connection with the regional wireless hotspot when executing the predetermined function next time.

14. The method for executing the function according to claim 11, further comprising:

when the predetermined function is not executed successfully and the activity record does not include the first moving trail, starting to record the first moving trail of the mobile device until the predetermined function is executed successfully next time and adding the first moving trail of the mobile device to the activity record.

* * * * *